US012701192B2

(12) United States Patent
Tanaka

(10) Patent No.: US 12,701,192 B2
(45) Date of Patent: Aug. 4, 2026

(54) SERVER APPARATUS, ASSISTANCE METHOD, AND NON-TRANSITORY COMPUTER-READABLE RECORDING MEDIUM

(71) Applicant: NEC Corporation, Tokyo (JP)

(72) Inventor: Masaya Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 18/274,407

(22) PCT Filed: Jan. 12, 2022

(86) PCT No.: PCT/JP2022/000733
§ 371 (c)(1),
(2) Date: Jul. 26, 2023

(87) PCT Pub. No.: WO2022/249530
PCT Pub. Date: Dec. 1, 2022

(65) Prior Publication Data
US 2024/0098188 A1 Mar. 21, 2024

(30) Foreign Application Priority Data
May 27, 2021 (JP) ................................. 2021-089353

(51) Int. Cl.
*H04M 11/04* (2006.01)
*G08B 25/10* (2006.01)
(52) U.S. Cl.
CPC ............. *H04M 11/04* (2013.01); *G08B 25/10* (2013.01)
(58) Field of Classification Search
CPC ............................... H04M 11/04; G08B 25/10

USPC ....................................................... 455/404.1
See application file for complete search history.

(56) References Cited

U.S. PATENT DOCUMENTS

| | | | | |
|---|---|---|---|---|
| 5,131,019 A | * | 7/1992 | Sheffer ................. | G08B 25/08 |
| | | | | 379/39 |
| 9,398,231 B2 | * | 7/2016 | Yuasa ..................... | G06T 7/292 |
| 10,110,856 B2 | * | 10/2018 | Rasheed ............... | H04N 7/181 |
| 2007/0185712 A1 | * | 8/2007 | Jeong ..................... | G10L 15/01 |
| | | | | 704/238 |
| 2015/0289122 A1 | * | 10/2015 | Friesen ................... | H04W 4/90 |
| | | | | 455/404.2 |

(Continued)

FOREIGN PATENT DOCUMENTS

| | | |
|---|---|---|
| JP | 2005-057343 A | 3/2005 |
| JP | 2005-064784 A | 3/2005 |

(Continued)

OTHER PUBLICATIONS

International Search Report for PCT Application No. PCT/JP2022/000733, mailed on Mar. 29, 2022.

*Primary Examiner* — Qutbuddin Ghulamali
(74) *Attorney, Agent, or Firm* — Sughrue Mion, PLLC

(57) ABSTRACT

A server apparatus includes: an instructing unit that prompts a reporting device to transmit information showing a situation of a site where an event to be reported has occurred, upon receipt of a call from the reporting device; an assistance information transmitting unit that transmits assistance information for assisting a caller operating the reporting device, to the reporting device; and an acquiring unit that acquires the information showing the situation of the site from the reporting device.

14 Claims, 10 Drawing Sheets

(56) References Cited

U.S. PATENT DOCUMENTS

| 2016/0165193 A1* | 6/2016 | Rasheed | ................ G06V 20/52 |
| | | | 348/143 |
| 2019/0364249 A1* | 11/2019 | Yamagaki | ............ H04N 21/654 |
| 2020/0077250 A1* | 3/2020 | Gideon, III | ........ G06Q 30/0205 |

FOREIGN PATENT DOCUMENTS

| JP | 2018-037813 A | 3/2018 |
| JP | 2020-202000 A | 12/2020 |

* cited by examiner

REPORTING SYSTEM 100

Fig.2

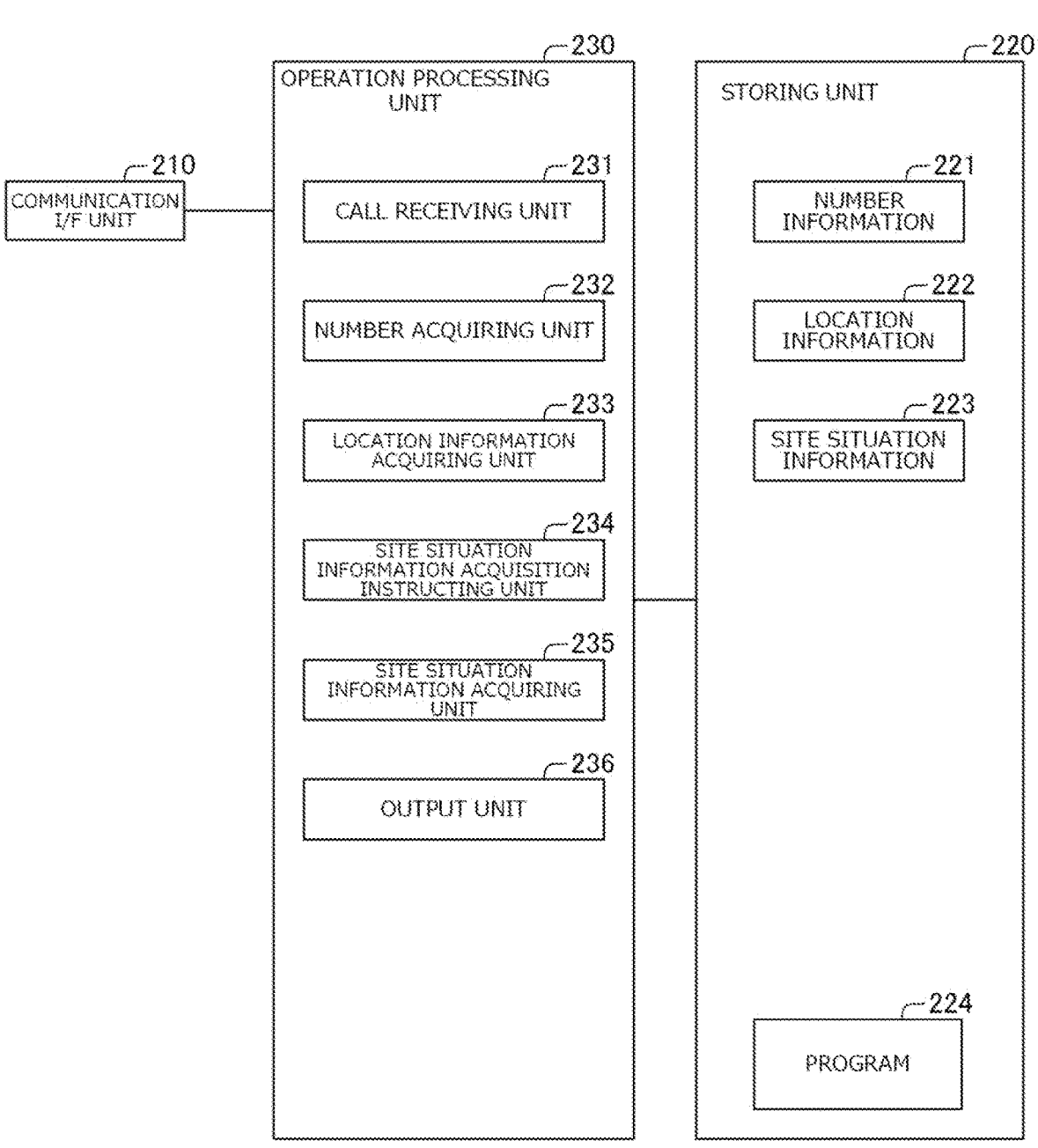

200 SERVER APPARATUS

230 OPERATION PROCESSING UNIT

210 COMMUNICATION I/F UNIT

231 CALL RECEIVING UNIT

232 NUMBER ACQUIRING UNIT

233 LOCATION INFORMATION ACQUIRING UNIT

234 SITE SITUATION INFORMATION ACQUISITION INSTRUCTING UNIT

235 SITE SITUATION INFORMATION ACQUIRING UNIT

236 OUTPUT UNIT

220 STORING UNIT

221 NUMBER INFORMATION

222 LOCATION INFORMATION

223 SITE SITUATION INFORMATION

224 PROGRAM

Fig.3

| TEMPERATURE INFORMATION | HUMIDITY INFORMATION | WIND DIRECTION INFORMATION | WIND SPEED INFORMATION | SOUND INFORMATION | SMOKE INFORMATION | MOMENTUM INFORMATION | INJURED PERSON INFORMATION | OBJECT INFORMATION | ... |
|---|---|---|---|---|---|---|---|---|---|
|  |  |  |  |  |  |  |  |  |  |

SITE METEOROLOGICAL INFORMATION          EVENT SITUATION INFORMATION

Fig.4

| | |
|---|---|
| TEMPERATURE INFORMATION | "VERY LOW" "LOW" "MODERATE" "HIGH" "VERY HIGH" |
| HUMIDITY INFORMATION | "VERY LOW" "LOW" "MODERATE" "HIGH" "VERY HIGH" |
| WIND DIRECTION INFORMATION | "NORTH" "WEST" "SOUTH" "EAST" |
| WIND SPEED INFORMATION | "CALM" "LIGHT" "STRONG" "VERY STRONG" |
| SOUND INFORMATION | "FAINT" "MODERATE" "LOUD" |
| SMOKE INFORMATION | "NONE" "WHITE" "BLACK" |
| MOMENTUM INFORMATION | "SUBSIDED" "NOT SURE" "INCREASING" |
| INJURED PERSON INFORMATION | "NONE "1 TO 5" "6 OR MORE" |
| OBJECT INFORMATION | "GENERAL HOUSING" "COMMERCIAL BUILDING" "VEHICLE" "NOT SURE" |

Fig.6

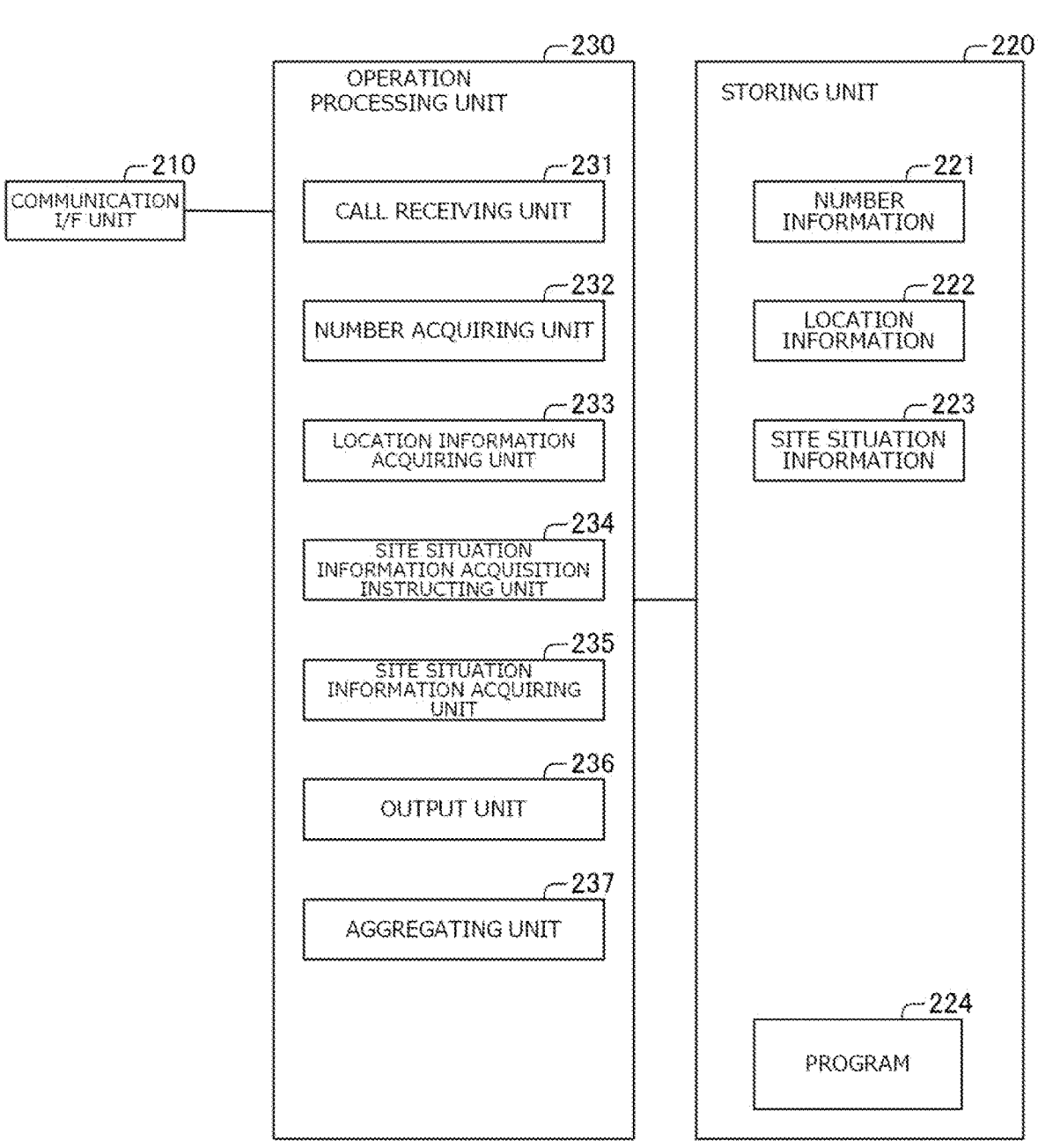

200 SERVER APPARATUS

230 OPERATION PROCESSING UNIT

220 STORING UNIT

210 COMMUNICATION I/F UNIT

231 CALL RECEIVING UNIT

232 NUMBER ACQUIRING UNIT

233 LOCATION INFORMATION ACQUIRING UNIT

234 SITE SITUATION INFORMATION ACQUISITION INSTRUCTING UNIT

235 SITE SITUATION INFORMATION ACQUIRING UNIT

236 OUTPUT UNIT

237 AGGREGATING UNIT

221 NUMBER INFORMATION

222 LOCATION INFORMATION

223 SITE SITUATION INFORMATION

224 PROGRAM

200 SERVER APPARATUS

SERVER APPARATUS, ASSISTANCE METHOD, AND NON-TRANSITORY COMPUTER-READABLE RECORDING MEDIUM

This application is a National Stage Entry of PCT/JP2022/000733 filed on Jan. 12, 2022, which claims priority from Japanese Patent Application 2021-089353 filed on May 27, 2021, the contents of all of which are incorporated herein by reference, in their entirety.

TECHNICAL FIELD

The present invention relates to a server apparatus, an assistance method, and a recording medium.

BACKGROUND ART

A technique used to receive an emergency call in police and fire services and the like is known.

For example, Patent Literature 1 describes an emergency call occurrence location video acquisition system that receives an emergency call from a telephone terminal. According to Patent Literature 1, the system acquires the location information of a telephone terminal upon receipt of an emergency call from the telephone terminal. The system also identifies a surveillance camera that can capture the originating location based on the acquired location information. Then, the system acquires image data captured by the identified surveillance camera.

CITATION LIST

Patent Literature

Patent Literature 1: Japanese Unexamined Patent Application Publication No. JP-A 2005-064784

SUMMARY OF INVENTION

Technical Problem

In the case of the technique as described in Patent Literature 1, image data cannot be acquired, for example, when there is no surveillance camera that can capture the originating location. Also, there is a possibility that appropriate image data cannot be always acquired due to the distant location of a surveillance camera.

These problems can be solved by acquiring image data from a telephone terminal having made an emergency call. However, there has been a possibility that appropriate image data cannot be always acquired, for example, because the possessor of a telephone terminal is unfamiliar. Thus, there has been a problem that it may be difficult to appropriately acquire information such as image data when it is intended to acquire some information from a caller, for example, during an emergency call.

Accordingly, an object of the present invention is to provide a server apparatus, an assistance method and a recording medium which solve the problem that it may be difficult to appropriately acquire information, for example, during an emergency call.

Solution to Problem

In order to achieve the object, a server apparatus as an aspect of the present disclosure includes: an instructing unit that prompts a reporting device to transmit information showing a situation of a site where an event to be reported has occurred, upon receipt of a call from the reporting device; an assistance information transmitting unit that transmits assistance information for assisting a caller operating the reporting device, to the reporting device; and an acquiring unit that acquires the information showing the situation of the site from the reporting device.

An assistance method as another aspect of the present disclosure is by an information processing apparatus, and the assistance method includes: prompting a reporting device to transmit information showing a situation of a site where an event to be reported has occurred, upon receipt of a call from the reporting device; transmitting assistance information for assisting a caller operating the reporting device, to the reporting device; and acquiring the information showing the situation of the site from the reporting device.

A recording medium as another aspect of the present disclosure is a non-transitory computer-readable recording medium having a program recorded thereon, and the program includes instructions for causing an information processing apparatus to realize processes to: prompt a reporting device to transmit information showing a situation of a site where an event to be reported has occurred, upon receipt of a call from the reporting device; transmit assistance information for assisting a caller operating the reporting device, to the reporting device; and acquire the information showing the situation of the site from the reporting device.

Advantageous Effects of Invention

With the configurations as described above, it is possible to provide a server apparatus, an assistance method and a recording medium which enables appropriate acquisition of information, for example, during an emergency call.

BRIEF DESCRIPTION OF DRAWINGS

FIG. 2 is a block diagram showing a configuration example of a server apparatus.

FIG. 3 is a view showing an example of site situation information.

FIG. 4 is a view showing an example of information acquired as site situation information.

FIG. 6 is a view showing another configuration example of the server apparatus.

DESCRIPTION OF EMBODIMENTS

First Example Embodiment

Figure 1:
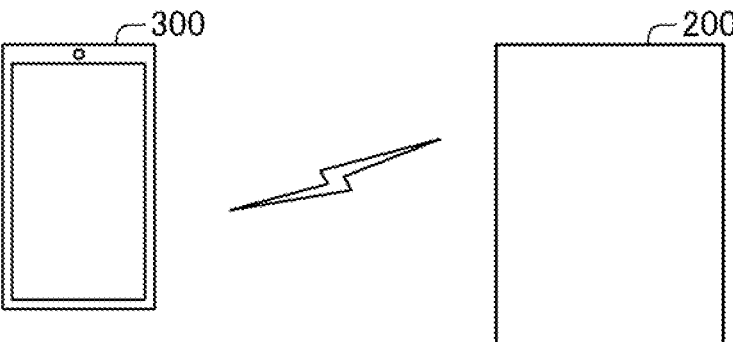
FIG. 1 is a configuration example of a reporting system in a first example embodiment of the present disclosure.
Figure 5:
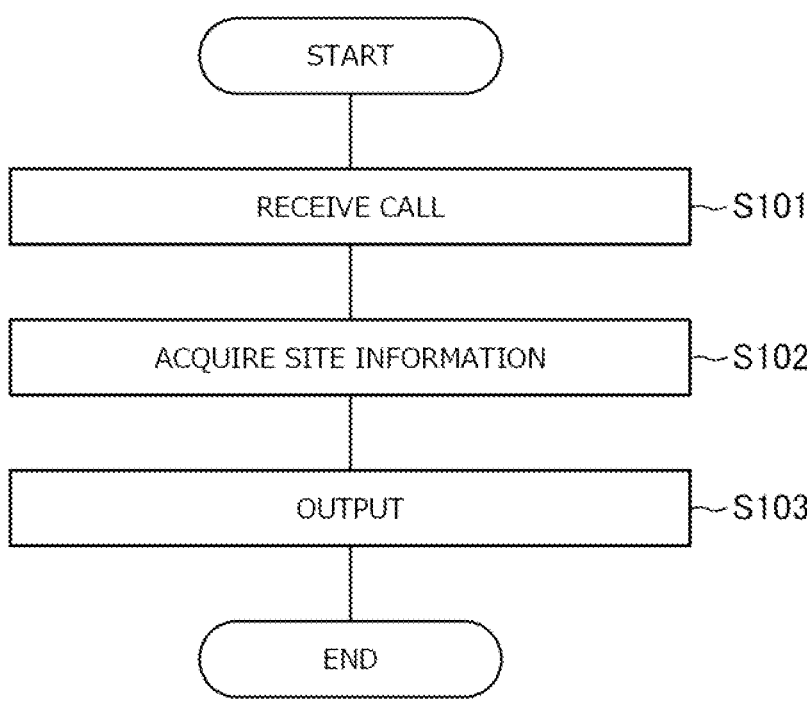
FIG. 5 is a flowchart showing an operation example of the server apparatus.
Figure 7:
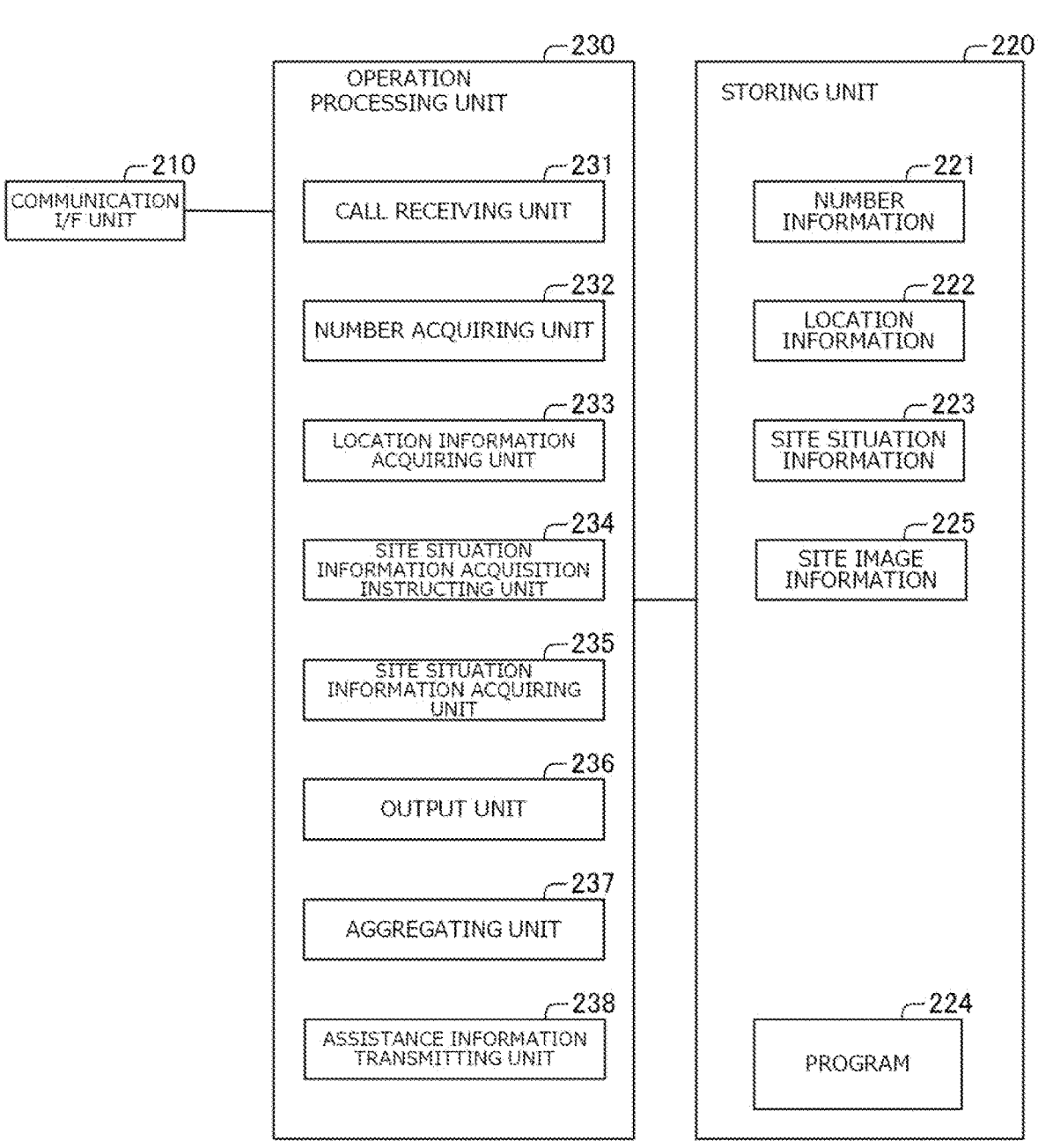
FIG. 7 is a view showing another configuration example of the server apparatus.
Figure 8:
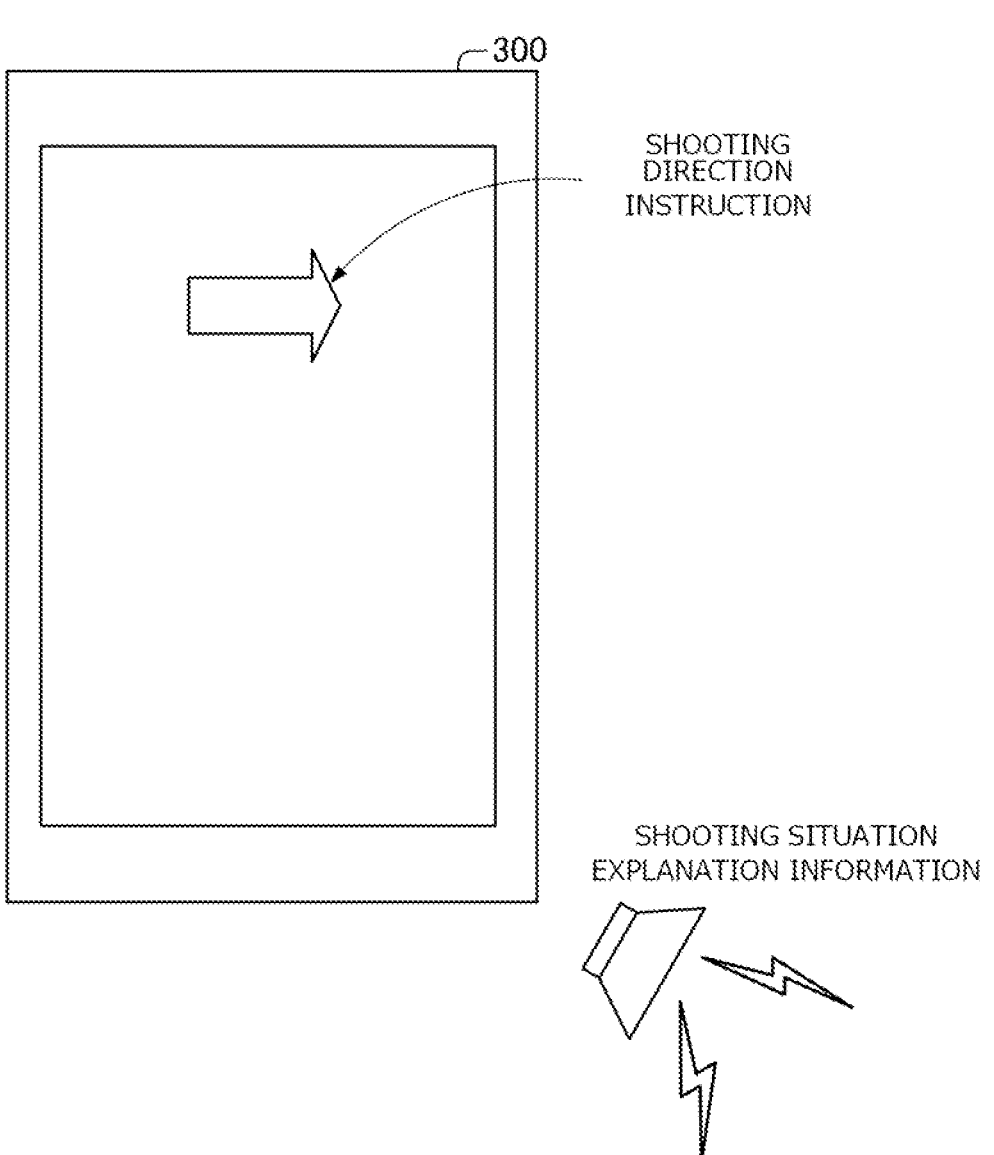
FIG. 8 is a view showing an output example according to an instruction from the server apparatus.

A first example embodiment of the present disclosure will be described with reference to FIGS. 1 to 8. FIG. 1 is a view showing a configuration example of a reporting system 100. FIG. 2 is a block diagram showing a configuration example of a server apparatus 200. FIG. 3 is a view showing an example of site situation information 223. FIG. 4 is a view showing an example of information acquired as the site situation information 223. FIG. 5 is a flowchart showing an operation example of the server apparatus 200. FIGS. 6 and 7 are views showing other configuration examples of the server apparatus 200. FIG. 8 is a view showing an output example according to an instruction from the server apparatus 200.

In the first example embodiment of the present disclosure, the reporting system 100 that receives a call such as an emergency call from a terminal device 300 will be described. As will be described later, upon receipt of a call, the server apparatus 200 acquires the telephone number, location information and the like of the terminal device 300 having made the call. Then, the server apparatus 200 uses the acquired telephone number, location information and the like to acquire information showing the situation of a site where the call has been made from the terminal device 300 and so forth. Moreover, the server apparatus 200 can transmit assistance information for giving assistance at the time of acquiring the information showing the situation of the site to the terminal device 300.

FIG. 1 shows a configuration example of the reporting system 100. Referring to FIG. 1, the reporting system 100 includes, for example, the server apparatus 200 and the terminal device 300 serving as a reporting device. As shown in FIG. 1, the server apparatus 200 and the terminal device 300 can be connected so as to be able of communicate with each other via wired or wireless communication.

The server apparatus 200 is an information processing apparatus that receives a call and also acquires information showing the situation of a site from the terminal device 300. For example, the server apparatus 200 is installed in a predetermined place such as a fire department command center. The server apparatus 200 may be realized on the cloud and the like.

FIG. 2 shows a configuration example of the server apparatus 200. Referring to FIG. 2, the server apparatus 200 has as major components, for example, a communication I/F unit 210, a storing unit 220, and an operation processing unit 230.

The communication I/F unit 210 includes a data communication circuit. The communication I/F unit 210 performs data communication with the terminal device 300 and so forth connected via a network and a communication line. The communication I/F unit 210 may perform data communication with an external device such as a device having meteorological information and a device storing map information. Here, the map information may contain building shape information such as the type of building and the positions of entrance and windows.

The storing unit 220 is a storage device such as a hard disk and memory. The storing unit 220 stores processing information necessary for a variety of processing in the operation processing unit 230 and a program 224. The program 224 realizes various processing units by being loaded and executed by the operation processing unit 230. The program 224 is loaded in advance from an external device or a recording medium via a data input/output function such as the communication I/F unit 210 and is stored in the storing unit 220. Major information stored in the storing unit 220 includes, for example, number information 221, location information 222, and site situation information 223. Here, at least a part of the number information 221, the location information 222, and the site situation information 223 may be associated with information showing that a call has been received, information showing the result of arrangement in response to the call, and the like.

The number information 221 is information showing the telephone number of the terminal device 300 having made a call. For example, the number information 221 represents, for each call, information showing the telephone number of the terminal device 300 having made the call. The number information 221 is updated, for example, when a number acquiring unit 232 acquires information showing a telephone number upon receipt of a call by a call receiving unit 231.

The location information 222 is information showing the location of a site where an event such as a fire and an incident has occurred. For example, the location information 222 represents, for each call, information showing the location of the terminal device 300 having made the call. Herein, the information showing the location is, for example, GPS positioning information, base station information, and the like. The information showing the location may contain information showing an address obtained from a caller. The location information 222 is updated, for example, when a location information acquiring unit 233 acquires the information showing the location upon receipt of the call by the call receiving unit 231.

The site situation information 223 is information showing the situation of a site where an event such as a fire and an incident having caused a call has occurred. As will be described later, the site situation information 223 is updated, for example, when a site situation information acquiring unit 235 acquires information showing the situation of a site from the terminal device 300 having made a call, and the like.

FIG. 3 shows an example of the site situation information 223. As shown in FIG. 3, the site situation information 223 includes at least one of site meteorological information that is information indicating the weather at the site, event situation information indicating the situation of an event having occurred at the site, and the like. Herein, the site meteorological information may include temperature information indicating temperature, humidity information indicating humidity, wind direction information indicating wind direction, wind speed information indicating wind speed, and the like. The event situation information may include sound information indicating the presence or absence, volume and type of sound occurring at the site, smoke information indicating the presence or absence and color of smoke, momentum information indicating the momentum of the event such as the momentum of the fire, injured person information indicating the presence or absence and number of injured persons, object information indicating an object where the event has occurred, such as general housing, commercial building, vehicle, and not sure, and the like. The site situation information 223 may include information showing a situation of the site other than those illustrated above.

Note that, as will be described later, the site situation information 223 may include qualitative information in addition to or instead of quantitative information. In other words, the site situation information 223 may include numerical value information acquired using a sensor and the like included by the terminal device 300, or may include information input by a caller possessing the terminal device 300 according to the subjectivity and senses of a caller.

The operation processing unit 230 has an arithmetic logic unit such as a CPU and a peripheral circuit thereof. The operation processing unit 230 loads the program 224 from the storing unit 220 and executes the program 224, and thereby makes the above hardware and the program 224 cooperate and realizes various processing units. Major processing units realized by the operation processing unit 230 include, for example, the call receiving unit 231, the number acquiring unit 232, the location information acquiring unit 233, a site situation information acquisition instructing unit 234, the site situation information acquiring unit 235, and an output unit 236.

The call receiving unit 231 receives a call from the terminal device 300. The configuration of the call receiving unit 231 may be a known one.

The number acquiring unit 232 acquires information indicating the telephone number of the terminal device 300 having made a call. For example, the number acquiring unit 232 acquires information indicating the telephone number by a known method when the call receiving unit 231 receives the call. Moreover, the number acquiring unit 232 stores the acquired information indicating the telephone number as the number information 221 into the storing unit 220.

The location information acquiring unit 233 acquires information showing the location of a site where an event such as a fire and an incident has occurred. For example, the location information acquiring unit 233 acquires information showing the location of the terminal device 300 as information showing the location of a site where an event such as a fire and an incident has occurred. Herein, the location information acquiring unit 233 may acquire information showing the location of the terminal device 300 using a known mechanism, such as receiving notification of GPS positioning information along with the call, and acquiring information indicating the address of a base station during the call. Meanwhile, the location information acquiring unit 233 may acquire information showing the location by a method other than those illustrated above, such as inputting an address obtained from the caller by a fire department staff, for example. Moreover, the location information acquiring unit 233 stores the acquired information showing the location as the location information 222 into the storing unit 220.

The site situation information acquisition instructing unit 234 prompts the terminal device 300 possessed by a caller to transmit information showing the situation of a site. For example, when the call receiving unit 231 receives a call, the site situation information acquisition instructing unit 234 uses a telephone number acquired by the number acquiring unit 232 to prompt the terminal device 300 to transmit information showing the situation of a site by SMS (Short Message Service) or the like. Specifically, for example, the site situation information acquisition instructing unit 234 transmits a URL (Uniform Resource Locator) for inputting information, and the like, to the terminal device 300 by SMS or the like, and thereby prompts input of information. As an example, the site situation information acquisition instructing unit 234 can prompt input of information by displaying options as illustrated in FIG. 4 on the terminal device 300. For example, the site situation information acquisition instructing unit 234 can prompt input of information by displaying, for each predetermined item such as temperature and humidity, corresponding options such as "very low", "low", "moderate", "high", and "very high" on the terminal device 300. The site situation information acquisition instructing unit 234 may be configured to perform the above processing in response to input by a fire department staff and the like after obtaining permission from the caller.

The site situation information acquisition instructing unit 234 may transmit an instruction to perform predetermined operation for acquiring information showing the situation of a site to the terminal device 300, along with or instead of performing the abovementioned processing. For example, it is possible to acquire information showing the direction of the wind by pointing the terminal 300 in a direction in which the wind is blowing and pressing the enter button. Therefore, the site situation information acquisition instructing unit 234 may prompt input of information by transmitting an operation instruction to the terminal device 300, such as "Point your smartphone in a direction where the wind is blowing and press the enter button". Moreover, the site situation information acquisition instructing unit 234 may be configured to prompt the terminal device 300 identified based on the information showing the location acquired by the location information acquiring unit 233 to input information, instead of using SMS or the like or along with using SMS or the like. For example, the site situation information acquisition instructing unit 234 may be configured to prompt the terminal device 300 located within a predetermined range from the location of the site to input information.

Further, the site situation information acquisition instructing unit 234 may identify surveillance cameras, various types of sensors and the like installed around the site based on the information showing the location acquired by the location information acquiring unit 233, and instruct the identified surveillance cameras, various sensors and the like to transmit information showing the situation of the site. Thus, the site situation information acquisition instructing unit 234 may be configured to cause, instead of the terminal device 300 or along with the terminal device 300, a sensor and the like installed near the site to transmit information.

The site situation information acquiring unit 235 acquires information showing the situation of a site from the terminal device 300 and the like. For example, the site situation information acquiring unit 235 acquires information from the terminal device 300, for example, when input according to induction by the site situation information acquisition instructing unit 234 into the terminal device 300 is performed. Also, the site situation information acquiring unit 235 may acquire information from a sensor and the like located near the site. Also, the site situation information acquiring unit 235 may acquire, in response to a predetermined operation such as pushing the enter button, corresponding information such as wind direction. Then, the site situation information acquiring unit 235 stores the acquired information as the site situation information 223 into the storing unit 220.

For example, the site situation information acquiring unit 235 acquires quantitative information acquired by a sensor and observation application included by the terminal device 300 as information showing the situation of the site. As stated above, the information acquired by the site situation information acquiring unit 235 may include site meteorological information, event situation information, and the like.

Further, as shown in FIG. 4, the site situation information acquiring unit 235 may acquire qualitative information according to the subjectivity and feeling of a caller possessing the terminal device 30, instead of the quantitative information or along with the quantitative information. For example, referring to FIG. 4, the site situation information acquiring unit 235 can acquire qualitative information about temperature, humidity, wind direction, and wind speed. The site situation information acquiring unit 235 can also acquire the presence or absence and volume of sound, the presence or absence and color of smoke, information about the momentum of fire or the like, the presence or absence of injured persons, information about an object where an event is occurring, and so forth.

The output unit 236 outputs the information acquired by the site situation information acquiring unit 235, the information corresponding to the result of acquisition by the site situation information acquiring unit 235, and so forth, to an external device such as a screen display device connected to the server apparatus 200 and an instruction terminal installed in the command center.

For example, the output unit 236 outputs the site situation information 223 and so forth stored in the storing unit 220. Moreover, the output unit 236 may perform predetermined determination based on the site situation information 223 and so forth and output the result of the determination. For example, the output unit 236 may determine and output information that can be used in responding to a call, such as the number and type of vehicles to be dispatched, based on the site situation information 223. For example, the output unit 236 may determine the presence or absence of hazmat vehicles and lighting vehicles (for example, the likelihood that they will be needed) and determine the number of ambulances, based on the strength of the wind, the color and amount of smoke, and so forth. Moreover, the output unit 236 may output the site situation information 223 in combination with meteorological information, map information and the like acquired from the outside. For example, the output unit 236 may determine a range where the fire may spread based on the wind strength and the like included in the meteorological information acquired from the outside or in the site meteorological information. Moreover, the output unit 236 may output the site situation information 223 in combination with the building shape information and the like. The output unit 236 may determine an approach route and the like based on the site situation information 223 and the building shape information, and output the determined result.

The above is the configuration example of the server apparatus 200.

The terminal device 300 is an information processing device that makes a call. For example, the terminal device 300 may be a general mobile terminal such as a smartphone. The terminal device 300 is possessed by a caller who makes a call and operated by the caller.

For example, the terminal device 300 makes a call in response to an operation of a caller. When making a call, the terminal device 300 can transmit GPS positioning information acquired by a GPS function or the like to the server apparatus 200. When the caller inputs information showing the situation of a site in accordance with information from the site situation information acquisition instructing unit 234, the terminal device 300 transmits the input information to the server apparatus 200. The terminal device 300 may acquire information showing the situation of a site such as temperature and humidity using a sensor included by the device, observation application included by the device, or the like, and transmit the acquired information to the server apparatus 200.

The above is the configuration example of the terminal device 300. Subsequently, an operation example of the server apparatus 200 will be described with reference to FIG. 5.

Referring to FIG. 5, the call receiving unit 231 of the server apparatus 200 receives a call (step S101).

The site situation information acquisition instructing unit 234 prompts the terminal device 300 possessed by a caller to transmit information showing the situation of a site. Then, the site situation information acquiring unit 235 acquires information showing the situation of the site from the terminal device 300 and the like (step S102). For example, the site situation information acquiring unit 235 acquires information from the terminal device 300, for example, in accordance with input by the terminal device 300 according to induction by the site situation information acquisition instructing unit 234.

The output unit 236 outputs information acquired by the site situation information acquiring unit 235, information corresponding to the result of acquisition by the site situation information acquiring unit 235, and so forth, to an external device such as a screen display device connected to the server apparatus 200 and an instruction terminal installed in the command center (step S103). The output unit 236 may perform predetermined determination based on the site situation information 223 and the like, and output the result of the determination.

The above is the operation example of the server apparatus 200.

Thus, the server apparatus 200 has the site situation information acquiring unit 235. With such a configuration, the server apparatus 200 can acquire information showing the situation of a site upon receipt of a call. As a result, it is possible to perform determination more appropriate for the situation of the site.

For example, a weather observation apparatus, a high-altitude camera and so forth are installed in each building such as a fire station and a city hall, and environment therearound may differ from that around a site where an event such as a fire has occurred. Using the present invention, it can be expected to acquire more accurate information around a site where an event has occurred. As a result, it is possible to perform more accurate determination for efficient rescue activities and the like.

As an example, information showing the situation of a site acquired by the present invention can be used as a reference, for example, in selecting emergency vehicles or deciding the number of emergency vehicles. For example, among the information showing the situation of a site acquired by the present invention, the strength of the wind, the color and amount of smoke, and so forth, can be used as a reference in determining the presence or absence of hazmat vehicles and lighting vehicles (for example, the likeliness that they will be needed) or in determining the number of ambulances. Moreover, by displaying a combination of the information showing the situation of the site, meteorological information, map information and the like on a screen display device such as a VR headset connected to the server apparatus 200 or on a screen display device such as a large display in the command center, it is possible to accurately assist the work at the site, such as enabling a dispatcher or an on-site staff to easily compare a building on fire with the building before burning.

As stated above, the site situation information acquisition instructing unit 234 may be configured to prompt the terminal device 300 within a predetermined range from the location of a site to input information. When thus configured, it is assumed that the site situation information acquiring unit 235 acquires information showing the situation of the site from a plurality of terminal devices 300. In order to cope with the above assumption, as shown in FIG. 6, the operation processing unit 230 of the server apparatus 200 may have an aggregating unit 237 in addition to the configuration illustrated in FIG. 2.

The aggregating unit 237 aggregates information showing the situation of a site acquired from a plurality of terminal devices 300. For example, the aggregating unit 237 averages the information showing the situation of the site acquired from the plurality of terminal devices 300. Then, the aggregating unit 237 stores the averaged result as the site situation information 223 into the storing unit 220. Meanwhile, the aggregating unit 237 may aggregate information by a method other than illustrated above, such as employing the most prevalent information. As the aggregating unit 237 thus aggregates information, it is possible to increase the accuracy of even qualitative information.

Further, the site situation information acquiring unit 235 of the server apparatus 200 may be configured to acquire image data showing the situation of a site in addition to or instead of quantitative or qualitative information. For example, referring to FIG. 7, the storing unit 220 of the server apparatus 200 may have site image information 225 for storing image data showing the situation of a site.

Further, as shown in FIG. 7, the operation processing unit 230 of the server apparatus 200 may have an assistance information transmitting unit 238, in addition to the configuration illustrated in FIG. 2 or FIG. 6.

The assistance information transmitting unit 238 indicates assistance information for assisting a caller in acquiring information showing the situation of a site to the terminal device 300 in response to receipt of a call by the call receiving unit 231. For example, the assistance information transmitting unit 238 can indicate, to the terminal device 300, assistance information for assisting a caller in acquiring image data as information showing the situation of a site.

For example, the assistance information transmitting unit 238 transmits, to the terminal device 300, shooting direction instruction information for instructing to display a mark such as an arrow indicating a desired shooting direction on the screen display unit, in response to an instruction by a fire department staff. In response to this instruction, the terminal device 300 can display the shooting direction such as an arrow on the screen as shown in FIG. 8. Here, the shooting direction instruction information may be information providing a voice direction indication. Moreover, the assistance information transmitting unit 238 may transmit, to the terminal device 300, shooting situation explanation information instructing to output the fact that image data is being acquired in response to a request by voice or display. In response to this instruction, as shown in FIG. 8, the terminal device 300 can output the fact that image data is being acquired in response to a request. For example, if the possessor of the terminal device 300 is made to acquire image data, there is a possibility that those around the possessor will misunderstand that the possessor is acquiring image data out of curiosity. By transmitting the abovementioned shooting situation explanation information as the assistance information, it is possible to acquire information showing the situation of a site, such as image data, under more appropriate circumstances without misleading those around. Meanwhile, the assistance information transmitting unit 238 may transmit assistance information other than illustrated above to the terminal device 300. For example, the assistance information transmitting unit 238 may transmit, to the terminal device 300, assistance information for displaying the fact that it is appropriate, such as an OK mark, when a shooting target location such as a building on fire is displayed on the screen of the terminal device 300.

Thus, with the assistance information transmitting unit 238, it becomes possible to transmit assistance information such as shooting direction instruction information and shooting situation explanation information to the terminal device 300. As a result, on the terminal device 300, the assistance information can be output. Consequently, it is possible to properly acquire image data, for example, when making an emergency call. The assistance information transmitting unit 238 may indicate, to the terminal device 300, assistance information for assisting a caller in acquiring information showing the situation of a site other than image data, for example, may transmit assistance information instructing output the fact that qualitative data is being input in response to a request.

Further, in a case where the server apparatus 200 acquires image data, the site situation information acquiring unit 235 of the server apparatus 200 may be configured to execute predetermined image processing on the acquired image data and thereby acquire, from the image data, site meteorological information such as wind direction and wind speed, event situation information such as smoke information, momentum information, injured person information and object information, and the like. The server apparatus 200 may realize the abovementioned processing by a known image processing means, for example, by template matching or using a model learned in advance. Thus, the site situation information acquiring unit 235 may be configured to acquire site situation information based on image data.

Second Example Embodiment

Next, with reference to FIGS. 9 and 10, a second example embodiment of the present invention will be described. In the second example embodiment of the present invention, the overview of a configuration of a server apparatus 400 that is an information processing apparatus will be described.

Figure 9:
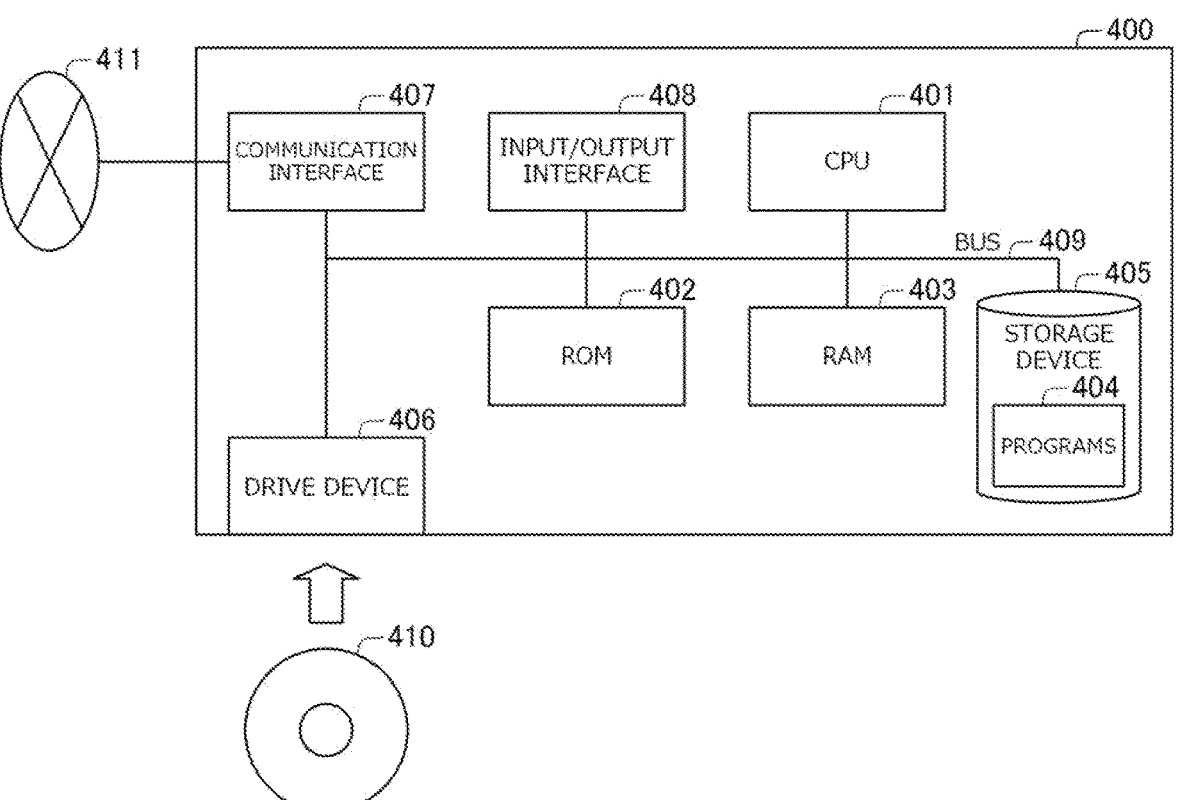
FIG. 9 is a view showing a hardware configuration example of a server apparatus in a second example embodiment of the present disclosure.

FIG. 9 shows a hardware configuration example of the server apparatus 400. Referring to FIG. 9, the server apparatus 400 has, as an example, the following hardware configuration including a CPU (Central Processing Unit) 401 (arithmetic logic unit), a ROM (Read Only Memory) 402 (memory unit), a RAM (Random Access Memory) 403 (memory unit), programs 404 loaded to the RAM 403, a storage device 405 storing the programs 404, a drive device 406 reading from and writing into a recording medium 410 outside the information processing apparatus, a communication interface 407 connected to a communication network 411 outside the information processing apparatus, an input/output interface 408 performing input/output of data, and a bus 409 connecting the components.

Figure 10:
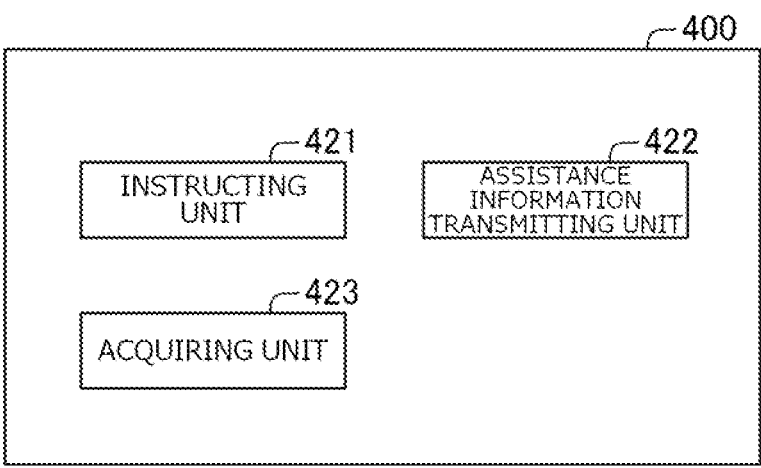
FIG. 10 is a block diagram showing a configuration example of the server apparatus.

Further, the server apparatus 400 can realize functions as an instructing unit 421, an assistance information transmitting unit 422 and an acquiring unit 423 shown in FIG. 10 by acquisition and execution of the programs 404 by the CPU 401. The programs 404 are, for example, stored in the storage device 405 or the ROM 402 in advance, and loaded to the RA 403 and the like and executed by the CPU 401 as necessary. Meanwhile, the programs 404 may be supplied to the CPU 401 via the communication network 411, or may be stored in the recording medium 410 in advance and retrieved and supplied to the CPU 401 by the drive device 406.

Note that FIG. 9 shows an example of the hardware configuration of the server apparatus 400. The hardware configuration of the server apparatus 400 is not limited to the abovementioned case. For example, the server apparatus 400 may be configured by part of the abovementioned configuration, for example, without the drive device 406.

The instructing unit 421 prompts a reporting device to transmit information showing the situation of a site where an event to be reported has occurred, in response to receipt of a call from the reporting device.

The assistance information transmitting unit 422 transmits assistance information for assisting a caller operating the reporting device, to the reporting device. For example, the assistance information transmitting unit 422 transmits, to the reporting device, assistance information for assisting the caller in acquiring/inputting information showing the situation of the site and in transmitting the information.

The acquiring unit 423 acquires the information showing the situation of the site from the reporting device.

Thus, the server apparatus 400 has the assistance information transmitting unit 422. According to such a configuration, the assistance information transmitting unit 422 can transmit assistance information for assisting a caller operating a reporting device, to the reporting device. As a result, the caller possessing the reporting device can acquire/input and transmit information showing the situation of a site while being assisted by the assistance information. Consequently, it is possible to appropriately acquire information, for example, when making an emergency call.

The information processing apparatus such as the server apparatus 400 described above can be realized by installation of a predetermined program in the information processing apparatus. Specifically, a program as another aspect of the present invention is a program for causing the information processing apparatus such as the server apparatus 400 to realize processes to: prompt a reporting device to transmit information showing the situation of a site where an event to be reported has occurred, in response to receipt of a call from the reporting device; transmit assistance information for assisting a caller operating the reporting device, to the reporting device; and acquire the information showing the situation of the site from the reporting device.

Further, an inspection method executed by the above information processing apparatus includes instructions for causing the information processing apparatus to prompt a reporting device to transmit information showing the situation of a site where an event to be reported has occurred, in response to receipt of a call from the reporting device; transmit assistance information for assisting a caller operating the reporting device, to the reporting device; and acquire the information showing the situation of the site from the reporting device.

The invention of a program (or a recording medium) or an assistance method having the abovementioned configuration also has the same actions and effects as in the above case, and therefore, can achieve the object of the present invention.

<Supplementary Notes>

The whole or part of the example embodiments disclosed above can be described as the following supplementary notes. Below, the overview of a server apparatus and so forth according to the present invention will be described. However, the present invention is not limited to the following configurations.

(Supplementary Note 1)

A server apparatus comprising:

an instructing unit that prompts a reporting device to transmit information showing a situation of a site where an event to be reported has occurred, upon receipt of a call from the reporting device;

an assistance information transmitting unit that transmits assistance information for assisting a caller operating the reporting device, to the reporting device; and an acquiring unit that acquires the information showing the situation of the site from the reporting device.

(Supplementary Note 2)

The server apparatus according to Supplementary Note 1, wherein:

the acquiring unit acquires image data as the information showing the situation of the site; and the assistance information transmitting unit transmits the assistance information for assisting in acquiring the image data, to the reporting device.

(Supplementary Note 3)

The server apparatus according to Supplementary Note 2, wherein the assistance information transmitting unit transmits shooting direction instruction information instructing to output information indicating a shooting desired direction, to the reporting device.

(Supplementary Note 4)

The server apparatus according to Supplementary Note 2 or 3, wherein the assistance information transmitting unit transmits shooting situation explanation information instructing to output a fact that the image data is being acquired upon request, to the reporting device.

(Supplementary Note 5)

The server apparatus according to any one of Supplementary Notes 1 to 4, wherein the acquiring unit acquires at least one of site meteorological information showing weather at the site and event situation information showing a situation of the event having occurred at the site, as the information showing the situation of the site.

(Supplementary Note 6)

The server apparatus according to any one of Supplementary Notes 1 to 5, wherein the acquiring unit acquires qualitative information according to subjectivity and feeling of the caller, as the information showing the situation of the site.

(Supplementary Note 7)

The server apparatus according to any one of Supplementary Notes 1 to 6, wherein the acquiring unit acquires image data as the information showing the situation of the site and, based on the acquired image data, acquires at least one of site meteorological information showing weather at the site and event situation information showing a situation of the event having occurred at the site.

(Supplementary Note 8)

The server apparatus according to any one of Supplementary Notes 1 to 7, comprising an output unit that performs predetermined determination based on the information showing the situation of the site and outputs a result of the determination.

(Supplementary Note 9)

An assistance method by an information processing apparatus, the assistance method comprising:

prompting a reporting device to transmit information showing a situation of a site where an event to be reported has occurred, upon receipt of a call from the reporting device;

transmitting assistance information for assisting a caller operating the reporting device, to the reporting device; and acquiring the information showing the situation of the site from the reporting device.

(Supplementary Note 10)

A computer program comprising instructions for causing an information processing apparatus to realize processes to:

prompt a reporting device to transmit information showing a situation of a site where an event to be reported has occurred, upon receipt of a call from the reporting device;

transmit assistance information for assisting a caller operating the reporting device, to the reporting device; and acquire the information showing the situation of the site from the reporting device.

The program described in the above example embodiments and supplementary notes is stored in a storage device or recorded on a computer-readable recording medium. For example, the recording medium is a portable medium such as a flexible disk, an optical disk, a magnetooptical disk, and a semiconductor memory.

Although the present invention has been described with reference to the above example embodiments, the present invention is not limited to the above example embodiments. The configurations and details of the present invention can be changed in various manners that can be understood by one skilled in the art within the scope of the present invention.

The present invention is based upon and claims the benefit of priority from Japanese patent application No. 2021-089353, filed on May 27, 2021, the disclosure of which is incorporated herein in its entirety by reference.

REFERENCE SIGNS LIST 100 reporting system
200 server apparatus
210 communication FP unit
220 storing unit
221 number information
222 location information
223 site situation information
224 program
225 site image information
230 operation processing unit
231 call receiving unit
232 number acquiring unit
233 location information acquiring unit
234 site situation information acquisition instructing unit
235 site situation information acquiring unit
236 output unit
237 aggregating unit
238 assistance information transmitting unit
300 terminal device
400 server apparatus
401 CPU
402 ROM
403 RAM
404 programs
405 storage device
406 drive device
407 communication interface
408 input/output interface
409 bus
410 recording medium
411 communication network
421 instructing unit
422 assistance information transmitting unit
423 acquiring unit

What is claimed is:

1. A server apparatus comprising:

at least one memory configured to store instructions; and at least one processor configured to execute the instructions to:

prompt a reporting device to transmit information showing a situation of a site where an event to be reported has occurred, upon receipt of a call from the reporting device;

transmit, to the reporting device, assistance information for assisting a caller operating the reporting device;

acquire the information showing the situation of the site from the reporting device;

acquire image data as the information showing the situation of the site;

transmit, to the reporting device, the assistance information for assisting acquisition of the image data; and transmit, to the reporting device, shooting situation explanation information instructing to output a fact that the image data is being acquired by the reporting device upon request.

2. The server apparatus according to claim 1, wherein the at least one processor is further configured to execute the instructions to transmit, to the reporting device, shooting direction instruction information instructing to output information indicating a shooting desired direction.

3. The server apparatus according to claim 1, wherein the at least one processor is further configured to execute the instructions to acquire at least one of site meteorological information showing weather at the site and event situation information showing a situation of the event having occurred at the site, as the information showing the situation of the site.

4. The server apparatus according to claim 1, wherein the at least one processor is further configured to execute the instructions to acquire qualitative information according to subjectivity and feeling of the caller, as the information showing the situation of the site.

5. The server apparatus according to claim 1, wherein the at least one processor is further configured to execute the instructions to acquire image data as the information showing the situation of the site and, based on the acquired image data, acquire at least one of site meteorological information showing weather at the site and event situation information showing a situation of the event having occurred at the site.

6. The server apparatus according to claim 1, wherein the at least one processor is further configured to execute the instructions to perform a predetermined determination based on the information showing the situation of the site and output a result of the determination.

7. An assistance method by an information processing apparatus, the assistance method comprising:

prompting a reporting device to transmit information showing a situation of a site where an event to be reported has occurred, upon receipt of a call from the reporting device;

transmitting assistance information for assisting a caller operating the reporting device, to the reporting device;

acquiring the information showing the situation of the site from the reporting device;

acquiring image data as the information showing the situation of the site;

when transmitting the assistance information to the reporting device, transmitting, to the reporting device, the assistance information for assisting in acquiring the image data; and when transmitting the assistance information to the reporting device, transmitting, to the reporting device, shooting situation explanation information instructing to output a fact that the image data is being acquired upon request.

8. The assistance method according to claim 7, further comprising, when transmitting the assistance information to the reporting device, transmitting, to the reporting device, shooting direction instruction information instructing to output information indicating a shooting desired direction.

9. The assistance method according to claim 7, further comprising acquiring at least one of site meteorological information showing weather at the site and event situation information showing a situation of the event having occurred at the site, as the information showing the situation of the site.

10. The assistance method according to claim 7, further comprising acquiring qualitative information according to subjectivity and feeling of the caller, as the information showing the situation of the site.

11. A non-transitory computer-readable recording medium having a program recorded thereon, the program comprising instructions for causing an information processing apparatus to realize processes comprising:

prompting a reporting device to transmit information showing a situation of a site where an event to be reported has occurred, upon receipt of a call from the reporting device;

transmitting assistance information for assisting a caller operating the reporting device, to the reporting device;

acquiring the information showing the situation of the site from the reporting device;

acquiring image data as the information showing the situation of the site;

when transmitting the assistance information to the reporting device, transmitting the assistance information for assisting in acquiring the image data, to the reporting device; and when transmitting the assistance information to the reporting device, transmitting shooting situation explanation information instructing to output a fact that the image data is being acquired upon request, to the reporting device.

12. The non-transitory computer-readable recording medium having the program recorded thereon according to claim 11, the program comprising instructions for causing the information processing apparatus to realize processes further comprising:

when transmitting the assistance information to the reporting device, transmitting shooting direction instruction information instructing to output information indicating a shooting desired direction, to the reporting device.

13. The non-transitory computer-readable recording medium javom program recorded thereon according to claim 11, the program comprising instructions for causing the information processing apparatus to realize processes further comprising:

acquiring at least one of site meteorological information showing weather at the site and event situation information showing a situation of the event having occurred at the site, as the information showing the situation of the site.

14. The non-transitory computer-readable recording medium having the program recorded thereon according to claim 11, the program comprising instructions for causing the information processing apparatus to realize processes further comprising:

acquiring qualitative information according to subjectivity and feeling of the caller, as the information showing the situation of the site.

* * * * *